United States Patent [19]

Morner

[11] Patent Number: 4,653,774
[45] Date of Patent: Mar. 31, 1987

[54] SEAT BELT SYSTEM

[75] Inventor: Bengt O. J. S. Morner, Hovas, Sweden

[73] Assignee: Autoliv Development AB, Vargarda, Sweden

[21] Appl. No.: 793,283

[22] Filed: Oct. 31, 1985

[30] Foreign Application Priority Data

Nov. 2, 1984 [GB] United Kingdom ............... 8427719

[51] Int. Cl.⁴ .............................................. B60R 21/00
[52] U.S. Cl. .................................... 280/804; 297/473
[58] Field of Search ...................... 280/801, 802, 804; 297/473

[56] References Cited

U.S. PATENT DOCUMENTS 4,362,321 12/1982 Volk et al. ........................ 280/804
4,573,709 3/1986 Kawai et al. ..................... 280/804

Primary Examiner—John J. Love
Assistant Examiner—Kenneth R. Rice
Attorney, Agent, or Firm—Spencer & Frank

[57] ABSTRACT

A seat belt system has an elongate rail mounted in the motor vehicle, and a seat belt termination assembly movable along the rail and connected to one end of the seat belt. The termination assembly is driven along the rail by an elongate drive element which is motor driven. The termination assembly is releasably connected to the drive element by a toggle latch connection. The termination assembly is released from the drive element when subjected to a predetermined retarding force.

18 Claims, 7 Drawing Figures

4,653,774

SEAT BELT SYSTEM

BACKGROUND OF THE INVENTION

This Invention relates to a seat belt system, and more particularly to a passive seat belt system.

It has been proposed to provide a passive seat belt system in which the driver of a car or vehicle in which the system is fitted does not have to take any specific action to put on or buckle up a seat belt whenever he or she enters the car or vehicle. However, certain disadvantages have been experienced with such prior proposed arrangements.

SUMMARY OF THE INVENTION

According to this invention there is provided a seat belt system comprising means to anchor at least one end of a seat belt to a vehicle comprising an elongate rail, a seat belt termination assembly movable along the rail and connected to said one end of the seat belt, and means to drive the termination assembly along the rail comprising a motor to drive a drive element which extends along the rail, the termination assembly being releasably connected to said drive element.

Preferably the releasable connection is such that the connection will be released if, when the termination assembly is being driven in a predetermined direction, a predetermined force is applied to the termination assembly retarding or preventing the movement of the termination assembly.

Conveniently a locking station is provided on the rail into which the termination assembly may be locked when the seat belt is in the operative condition.

Advantageously the releasable connection comprises a toggle latch connection.

In one embodiment, the drive element is an elongate element which terminates in a shoe that is slidable along the rail, with the shoe having an engagement means to engage the termination assembly.

Preferably said engagement means comprise an engagement projection.

Conveniently the shoe has a lateral flange slidable in an undercut groove in a channel that constitutes the rail.

Preferably the toggle latch is carried by the termination assembly.

Advantageously the toggle latch is provided with means to manually operate the toggle latch at will.

Conveniently components of the toggle latch carry cam followers located to follow cams provided at or adjacent a locking station to facilitate disengagement of the termination assembly and the drive element at the locking station.

Preferably the components of the toggle latch engage parts of the locking station to retain the termination assembly at the locking station until re-connected with the drive element or manually released.

In one embodiment the toggle latch includes an engagement element to engage the drive element, with the engagement element being pivotally connected to an adjacent element of the latch, and being pivotally mounted on an element that passes through an elongate slot therein.

Preferably the pivot means connecting the engagement element to the next adjacent element of the latch can rest in one of two notches or recesses, corresponding to an engaged position and a disengaged position of the engagement element.

In order that the invention may be more readily understood and so that further features thereof may be appreciated, the invention will now be described by way of example, with reference to the accompanying drawings.

DETAILED DESCRIPTION OF THE PREFERRED EMBODIMENTS

Figure 1:
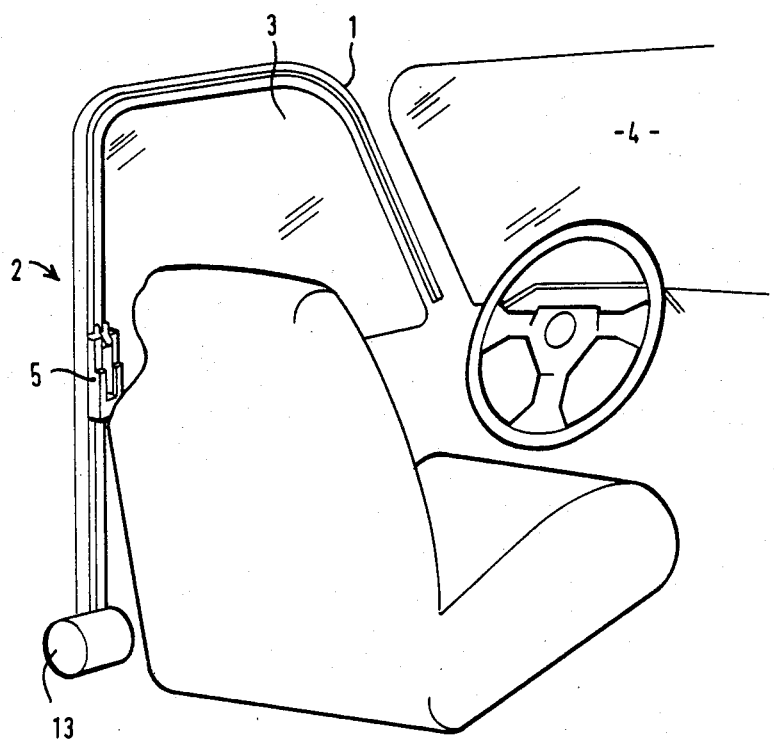
FIG. 1 is a perspective view of part of a car in which a seat belt system in accordance with the invention is mounted.

Referring initially to FIG. 1 a seat belt system incorporating the invention includes a rail member 1 that is mounted on the body of the car. The rail member extends vertically up the "B" post 2 located at the edge of the door 3 adjacent the seat to be occupied by the driver of the vehicle, across the top of the door towards the windscreen 4, and may also then extend downwardly between the windscreen and the door.

It is to be understood that when the arrangement that is to be described is fitted in a motor car, when the driver first enters the motor car a seat belt termination assembly will be located adjacent the end of the rail 1 which is remote from the B post 2. The seat belt will extend directly to a retractor reel which will be located adjacent the side of the driver's seat which is remote from the door 3. The driver will thus be able to climb into the car readily without being encumbered by the seat belt. Subsequently the seat belt termination assembly will move along the rail 1, as will be described hereinafter, to a locking station 5 located on the "B" post at a position adjacent the shoulder of a driver sitting in the driver's seat. When the seat belt termination assembly has reached the locking station 5, it will be locked securely in position, and the seat belt will then be located substantially diagonally across the chest of the driver. Thus the seat belt is affixed to the driver automatically, minimising any inconvenience on the part of the driver, and also ensuring that the driver does actually wear the seat belt.

Figure 2:
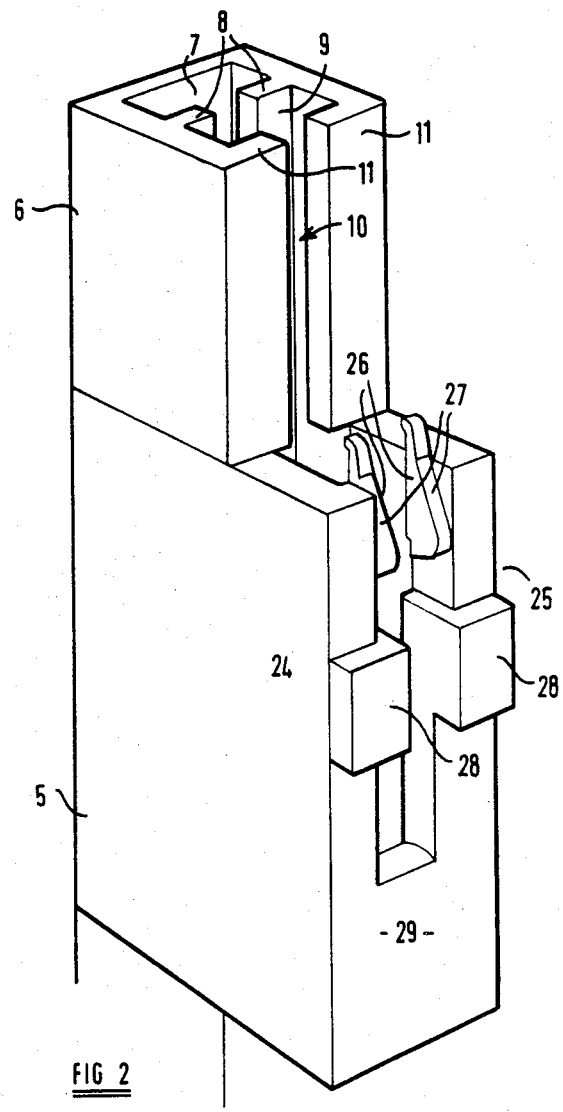
FIG. 2 is an enlarged view of part of the track of the system shown in FIG. 1.
Figure 3:
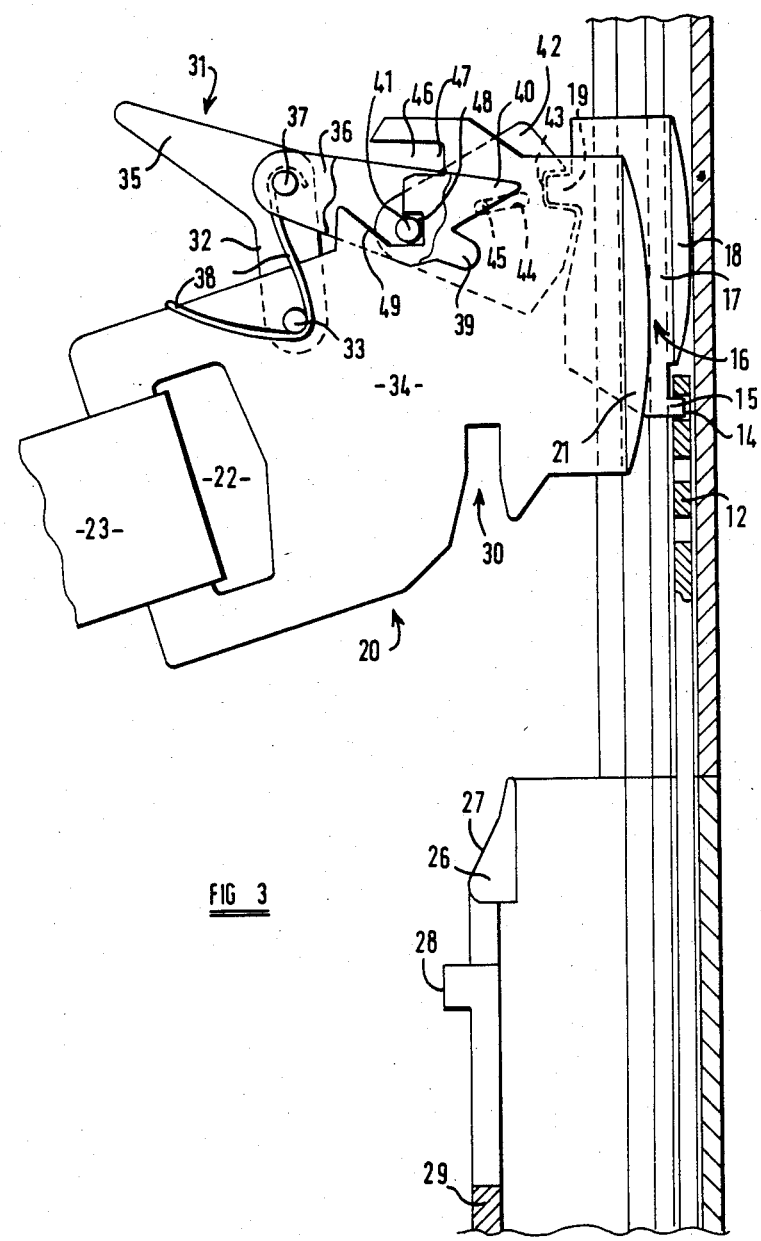
FIG. 3 is a sectional view, with parts cut away, showing the locking station and a shoe and a seat belt termination assembly that can move along the track.

Referring to FIGS. 1–3 the rail 1 may be formed as an extrusion, such as an extrusion of aluminium or the like, and comprises a basically "U" section channel member 6, having two coaligned pairs of inwardly directed flanges. Thus the channel has a broad portion 7 adjacent the foot of the channel, separated by a first pair of flanges 8 from another relatively broad portion 9 which is again limited, on the side adjacent the mouth 10 of the channel, by a second pair of inwardly directed flanges 11. The channel has an open mouth 10.

Located within the first broad portion of the channel is a drive tape, 12 which can be driven backwards and forwards by means of a motor 13 located at the base of the "B" post 2 adjacent the driver's seat. The drive tape is illustrated as being provided with a plurality of apertures therein, the terminal aperture 14 being engaged by a hook like portion 15 present on a shoe 16.

The shoe comprises a vertical web 17 which is located in the channel extending between the inwardly directed pairs of flanges 8, 11. The shoe has a transverse web 18 that is accommodated in the first broad portion 7 of the channel, and the shoe is thus slidable along the channel with the transverse web being retained beneath the first pair of inwardly directed flanges 8. The web 18 is designed to permit the shoe to slide readily in the channel, even if the channel extends round a corner. Thus the undersurface of the web 18 is curved. The vertical web 17 of the shoe is provided at the top edge thereof, i.e. the edge remote from the transverse web 18, with a substantially rectangular upwardly directed engagement protrusion 19.

When the motor 13 is actuated, the drive band 12 will be driven in or out, thus causing the shoe 16 to slide along the channel.

A seat belt termination assembly 20 is also provided which can slidably move along the channel. The seat belt termination assembly is provided with a vertically extending part which extends between the second pair of flanges 11 in the channel, and has a transverse web 21 which is engaged in the broad portion 9 of the channel between the first pair of flanges 8 and the second pair of flanges 11. The seat belt termination assembly can slide along the channel. The transverse web 21 is designed to permit the seat belt termination assembly to slide readily in the channel, even if the channel extends round a corner. Thus the undersurface of the web 21 is curved.

The seat belt termination assembly defines an aperture 22 through which a terminal portion of a seat belt 23 is looped. The seat belt termination assembly also has means which can releasably engage the engagement protrusion 19 on the shoe 16. When the engagement protrusion is thus engaged, when the motor is actuated the seat belt termination assembly can be driven along the rail 1, for example from an initial position to the locking station 5.

The locking station 5, which is shown in FIG. 2, comprises a housing which is mounted over the open mouth 10 at the top of the channel. Effectively, the housing comprises two upstanding flanges 24, 25 which effectively form a continuation of the side walls of the channel. The upstanding flanges 24, 25 are provided, adjacent their leading edges (i.e. the edges first encountered by the seat belt termination assembly as it approaches the locking station), with two inwardly directed projections 26 which each have a sloping upper surface defining a cam surface 27 which will engage part of a mechanism provided on the seat belt termination. Two outwardly protruding stop members 28 are also provided at the tops of the flanges 24, 25, and at a lower region the flanges are interconnected by a transverse element 29.

The seat belt termination assembly 20 (FIG. 3) includes a slot 30 which is located so that when the seat belt assembly is in the locking station 5 and is fully locked in position, the said transverse element 29 is located within the slot or, in other words, the slot is hooked around the transverse element. Thus the seat belt termination assembly will remain securely in position even if a substantial force is applied thereto, for example in the case of an accident.

The seat belt termination assembly is driven along the channel by means of the shoe 16 mentioned above. However, the shoe 16 does not engage a fixed abutment present on the seat belt termination assembly, but instead engages part of a toggle latch arrangement which releasably engages the engagement protrusion 19 provided on the shoe 16. When the toggle latch arrangement engages the upstanding projection, any movement of the shoe 16 causes a corresponding movement of the seat belt termination assembly 20. Thus, as the motor 13 is actuated the drive tape 12 is wound in (or out) and the seat belt termination moves with the shoe. However, the toggle latch arrangement is so designed that as soon as the seat belt termination experiences any significant resistance to movement the toggle latch is released and the seat belt termination assembly will then not move any further. Thus if a child places its finger in the path of the seat belt termination assembly as it is moving, for example, the seat belt termination assembly will experience a resistance to continuing movement, and the toggle latch arrangement will release the engagement protrusion 19. Also, when the seat belt termination assembly reaches the locking station 5 the seat belt termination assembly will experience a resistance to movement and the toggle latch arrangement will also release, although in the described embodiment at the locking station cams are provided which co-operate with components of the toggle-latch to facilitate operation of the toggle-latch as will be described below. Utilising such an arrangement, the motor 13 may "over run" even when the seat belt termination assembly has reached the locking station, thus overcoming problems that have arisen in connection with earlier corresponding devices where there was a direct drive between the motor and a movable seat belt termination assembly, thus necessitating an ability to stop the motor just as soon as the seat belt termination assembly reaches the locking station.

The toggle latch arrangement may also be manually actuated to release the seat belt termination assembly from the shoe in an emergency, or whenever it is desired to move the seat belt termination assembly to a different position and the motor is not working.

The toggle latch assembly comprises a cranked actuating lever 31 having two arms at an angle of approximately 135° to each arm. One end of one arm 32 is pivotally connected 33 to part of a vertically extending portion 34 of the seat belt termination assembly and protrudes substantially vertically, parallel with the axis of the channel, in the orientation of the arrangement shown in FIG. 3. The vertically extending portion 34 consists of two spaced apart plates, and the arm 32 is mounted in position between these plates. The other arm 35 extends substantially away from the channel and is thus readily manually accessible.

Two lifter plates 36, of the same substantially triangular configuration, are pivotally connected at 37 to the cranked lever 31 at the apex thereof. The lifter plates 36 lie on each side. A spring 38 is provided which engages the edge of the vertically extending portion of the seat belt termination assembly passes round the pivot 33, and terminates at the pivot 37. The spring 38 serves to bias the cranked lever towards the rail, in a pivotal motion about the point of pivotal connection 33 between the cranked lever and the seat belt termination assembly.

The two lifter plates 36 are coaligned with each other and are located on the outside of the vertically extending portion 34 of the seat belt termination assembly 20. Each lifter plate is an elongate substantially triangular element having a protruding cam follower 39 at a point remote from the point of pivotal connection 37 between the lifter plate and the said cranked lever 31, and also having a second angular cam follower 40 located above the first cam follower. The cam follower 40 effectively forms one of the corners of the substantially triangular lifter plate.

At a point between the first cam follower 39 and the point of pivotal connection 37 of the lifter plate 36 to the said cranked lever 31 a further pivot means 41 is provided. The pivot means 41 extends between the two lifter plates and pivotally supports an engagement plate 42 which is located between the two spaced apart plates of the vertically extending portion 34, of the seat belt termination assembly.

The engagement plate 42 has a recess 43 formed therein at a point spaced from the point of pivotal connection 41 to the lifter plates 36, the recess 43 being dimensioned to accommodate the engagement protrusion 19 provided on the shoe 16. The engagement plate 42 is also provided with an elongate slot 44 therein, the slot lying substantially on a line connecting the said recess 43 and the point of pivotal connection 41 of the engagement plate 42 to the lifter plates 36. A guide pin 45 is provided which extends between the two spaced apart plates forming the vertical portion 34 of the seat belt termination assembly between which the engagement plate 42 is located, the pin extending through the elongate slot 44.

The two plates forming the vertical portion 34 of the seat belt termination assembly 20 define a specific recess 46 which accommodates the pivot pin 41 connecting the lifter plates 36 to the engagement plate 42. This recess 46 defines two notches 47, 48 in which the pivot pin 41 may rest, and also defines a sloping cam face 49 to direct the pivot pin 41 in a predetermined direction when the seat belt termination assembly is to be disconnected from the shoe 16.

Figure 4:
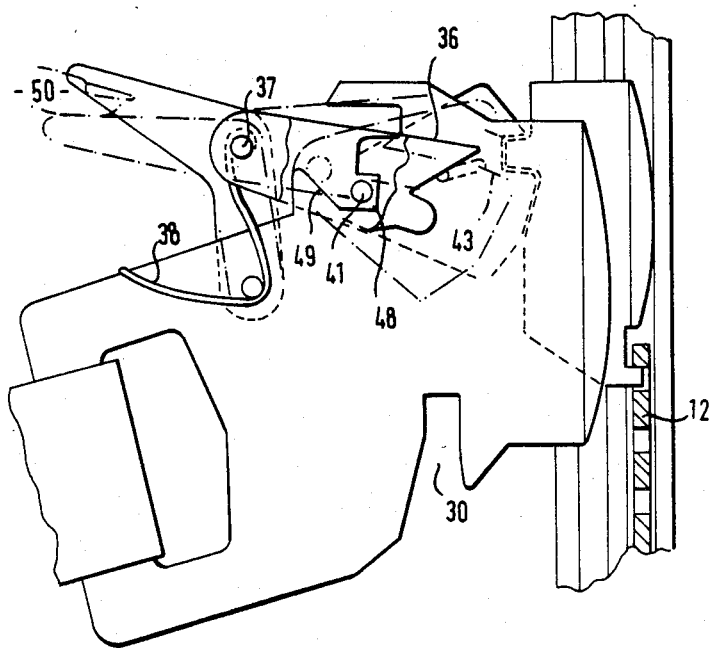
FIG. 4 shows the seat belt termination assembly, illustrating how it can be manually disengaged from the shoe.
Figure 5:
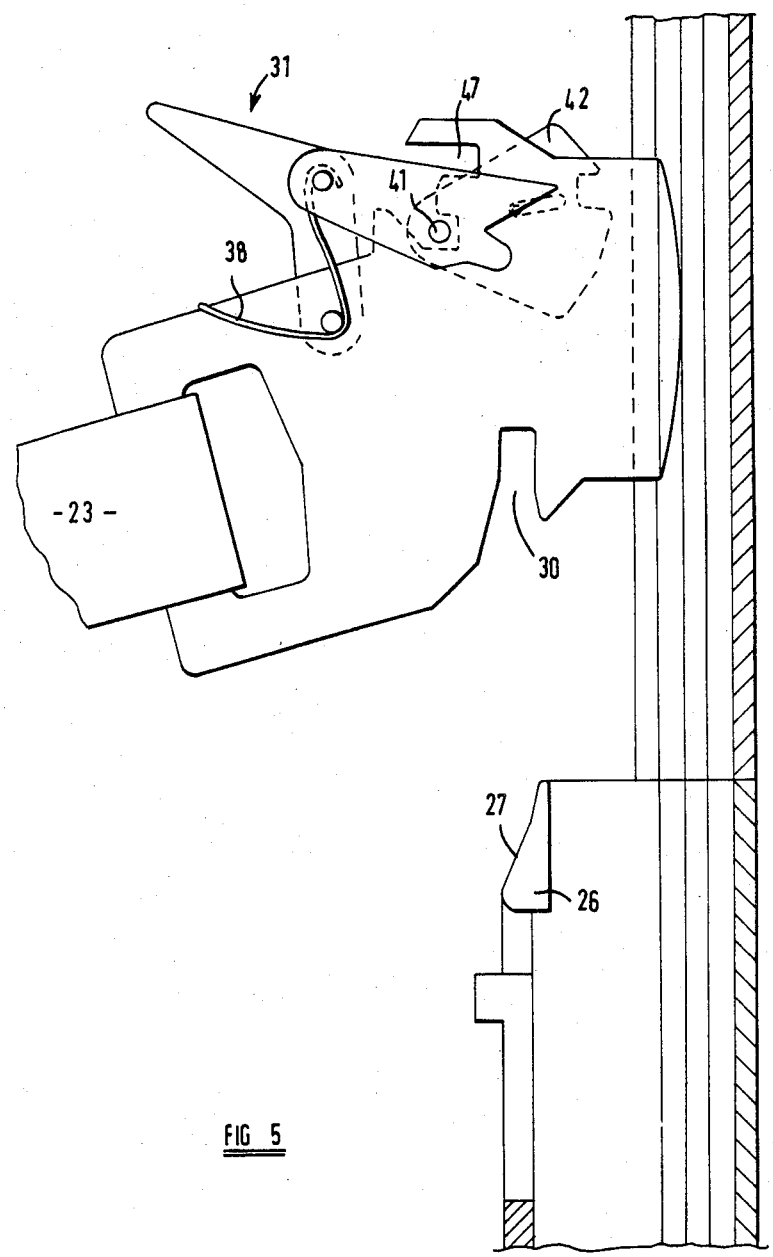
FIG. 5 illustrates the seat belt termination assembly when disengaged from the shoe.

When the seat belt assembly is in the condition illustrated in FIG. 4, if it is desired to disconnect the seat belt termination assembly 20 from the shoe, the arm 35 of the cranked lever 31 is moved by applying manual pressure 50, against the bias of the spring 38, thus causing the lever to pivot about the pivot axis 33. This causes the lifter plates 36 to move and the pivot pin 41 that connects the lifter plates 36 to the engagement plate 42 moves upwardly away from the channel out of its notch. Whilst this movement is happening the engagement plate 42 is lifted and the guide pin 45 moves to the middle of the elongate slot 44. Continued application of pressure to the lever 31 causes the pivot 41 interconnecting the lifter plates 36 and the detent plate to follow the inclined cam surface 49 which causes the engagement plate 42 to pivot about guide pin 45, thus releasing the recess 43 from the engagement protrusion 19 provided on the shoe 16. The seat belt termination assembly 20 may then slide along the channel independently of the shoe 16 and the lever 31 may be released. If the seat belt termination assembly is moved again to the position occupied by the shoe, the detent plate will be moved against the spring force applied thereto by the toggle latch described above until the recess 43 in the engagement plate 42 again engages the engagement protrusion 19 provided on the shoe.

As the seat belt termination assembly 20 is being driven downwardly by the shoe, when the seat belt termination assembly 20 encounters anything that resists the free movement of the seat belt termination assembly, the shoe 16 will continue to move, whilst the seat belt termination assembly will tend to be retarded. The engagement protrusion 19 provided on the shoe 16 will thus provide a force to the lowermost edge of the recess 43 in the engagement plate 42. This force will tend to pivot the engagement plate 42 about the pin 45 whilst driving the pivot pin 41 connecting the lifting plates 36 and the engagement plate 42 out of the notch 48 in which it is accommodated. Simultaneously the lifter plates move upwardly, and the lever 31 is moved against the bias of the spring 38. Once the pivot pin 41 has been lifted out of the notch 48 the continuing pressure applied to the engagement plate 42 by the engagement protrusion 19 will cause a continuing movement of the engagement plate about the pin 45 passing through the elongate slot 44 therein. The engagement plate is thus turned so that the recess in the engagement plate is disengaged from the engagement protrusion 19, whilst the pivot pin 41 interconnecting the lifting plates 36 and the engagement plate 42 becomes engaged in the upper notch 47. It is biassed firmly into the notch 47 by the effect of spring 38. The engagement plate 42 is thus maintained in a position where the recess 43 is disengaged from the engagement protrusion 19 present on the shoe, and can only be reengaged therewith if the shoe moves upwardly towards the seat belt termination assembly, or if the seat belt termination assembly moves downwardly towards the detent.

When the seat belt termination reaches the locking station 5 described above, the toggle latch serves to release the shoe in a manner as described above, but operation of the toggle latch is facilitated and smoothened by the cam followers 39, 40 provided on the lifter plates and the cams surfaces 27 provided at the locking station. Thus, as the seat belt termination initially approaches the locking station the first cam followers 39 will engage the cam surface 27, which will serve to lift the lifter plates against the spring bias provided by the spring 38, until the point of pivotal connection 41 between the lifter plates 36 and the engagement plate 42 is located at a position just out of the notch 48 that it initially occupies. The second cam follower 40 will then ride up the cam surfaces, whilst the pivot pin 41 interconnecting the lifter plates and the engagement plate traverses the distance between the two notches 47, 48. Subsequently the leading edge of the first cam follower 39 will engage the stops 28 provided at the locking station, which will assist in the final movement of the toggle latch to the position in which the pivot pin 41 is located in the second notch. This moves the engagement plate 42 to such a position that the recess 43 therein is released from the engagement protrusion present on the shoe 16, and the shoe can continue its downward movement, as driven by the motor.

The slot 30 formed in the main part of the seat belt termination assembly 20 will then engage the transverse portion 29 of the member interconnecting the extensions of the flanges of the side walls of the channels, and thus the seat belt termination is able to withstand a severe applied force, for example, the force that may be applied to it from a seat belt worn by the driver of the car if the car is involved in an accident.

Figure 6:
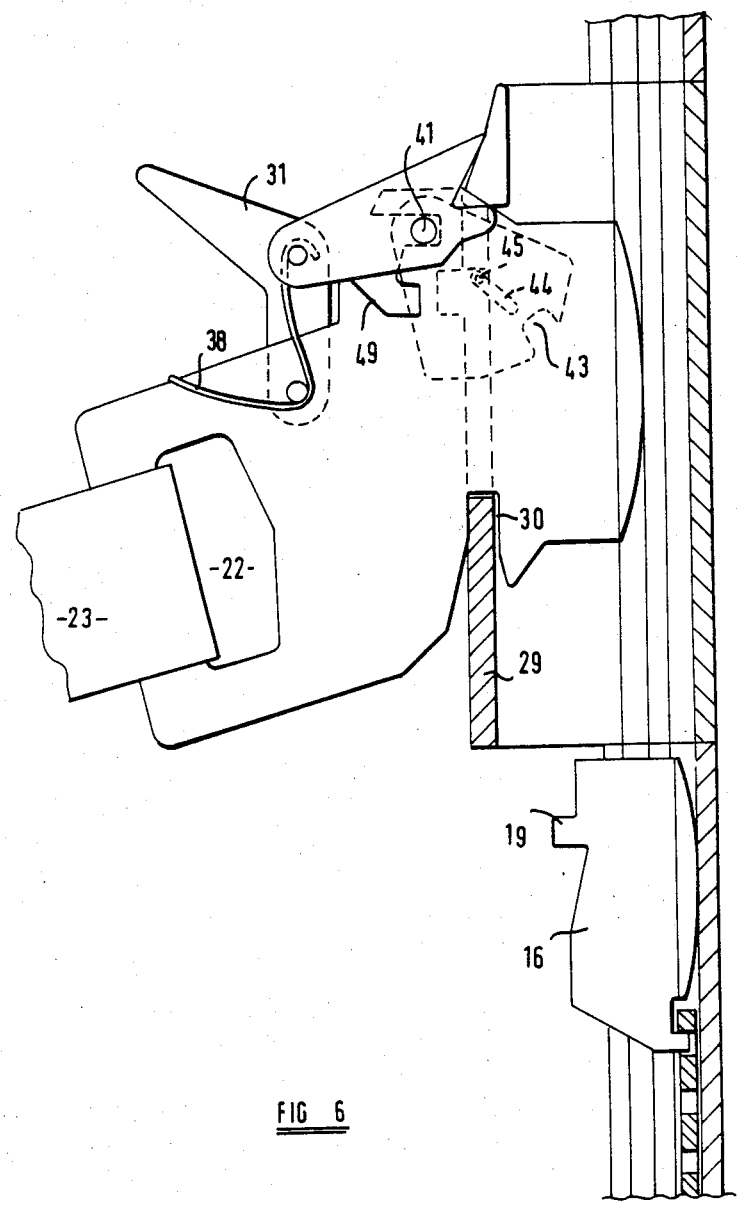
FIG. 6 shows the locking station, seat belt termination assembly and the shoe when the seat belt termination assembly is locked in the locking station.
Figure 7:
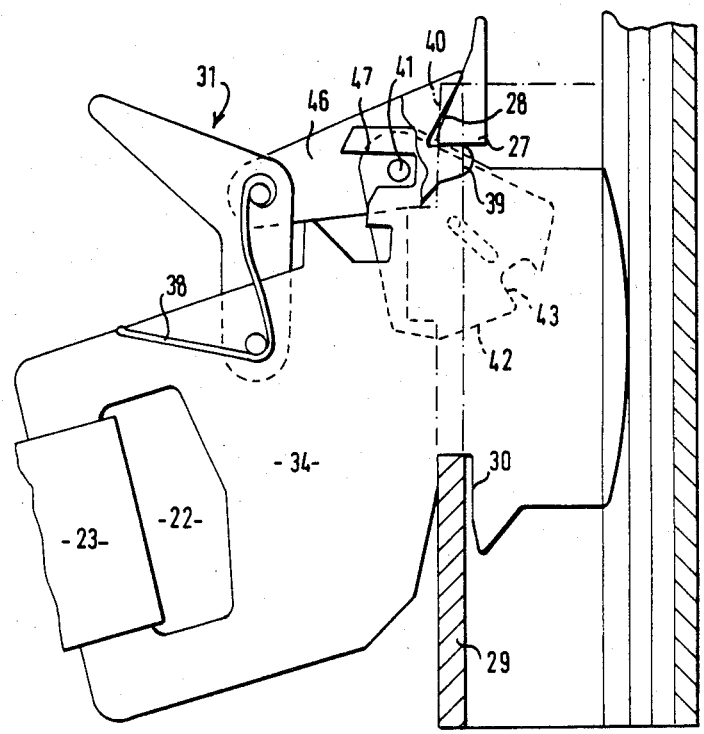
FIG. 7 is a view of the seat belt termination assembly when in the locking station.

It is to be noted that, as shown in FIGS. 6 and 7, when the seat belt termination assembly is in the locking station, the first cam followers 39 present on the lifting pltes 36 are biased downwardly by the spring to occupy a position immediately behind the projections 26 provided on the locking station. Also, the second cam followers 40 lie flush with the cam surfaces 27. The lifting plates 36 thus serve to lock the seat belt termination assembly 20 in position and prevent inadvertent upward movement of the seat belt termination assembly. If the seat belt termination assembly 20 is to be disengaged from the locking station, for example in the case of an accident, actuation of the lever 31 will withdraw the lifting plates 36 from the position in which the cam followers 39 engage the projections 26, whilst simultaneously causing the engagement plate to pivot slightly about the pivot pin 45 present in the elongate slot 44 therein, but when the cam followers 39 have been disengaged from the projections 26 the seat belt termination assembly 20 be slid upwardly away from the locking station 5.

When the seat belt termination is in the locking station, if the motor is reactivated in the opposite sense, the shoe will move upwardly, and the engagement projection 19 in the shoe 16 will engage the recess 43 in the engagement plate 42. This will tend to pivot the engagement plate 42 about the pivot pin 45 through the elongate slot therein lifting up the pivot pin 41 interconnecting the lifter plates 36 and the engagement plate 42 out of the notch 47 in the recess. Continuing upward movement of the shoe will pivot the engagement plate about the pivot pin 45 in such a way that the point of pivotal connection 41 of the lifter plates and the notch engagement plate 42 is moved backwardly into the notch 48. The point of pivotal connection 41 of the lifter plates 36 and the engagement plate 42 is driven firmly into that notch by the spring bias applied by the spring 38. The engagement projection 19 present on the shoe is then re-engaged with the recess in the engagement plate, and the seat belt termination assembly will move upwardly, thus completing the cycle of operation of the device.

Whilst the invention has been described with reference to one specific embodiment which relates solely to a diagonal belt, it is envisaged that it may be possible to create embodiments of the invention for use with a lap and diagonal belt. Of course, in such an embodiment two locking stations will be required to accommodate the two ends of the belt, one located adjacent the shoulder of the driver and one located very close to the motor. It is envisaged that it may be possible to design two locking stations, the locking stations being of different widths. The lower locking station of the pair will have a configuration as described above. The upper locking station, however, will be of a slightly wider configuration and instead of having a complete transverse portion to be engaged by the slot formed in the seat belt termination, it will have two inwardly directed flanges. The lower seat belt termination will be as described, but the seat belt termination to engage the upper station will be slightly wider and the cams and cam followers thereof will be located further apart than the corresponding components on the lower seat belt termination. The arrangement will be such that the lower seat belt termination may pass freely through the upper locking station without engaging the locking station in any way. However, the upper seat belt termination will be so designed that it will lockingly engage the upper locking station when it arrives at the upper locking station.

Whilst, in this specification, reference has been made to the provision of a seat belt system for the driver of a vehicle such as a car, it is to be understood that corresponding systems may be provided for the passengers in a car whether in the front or rear seats. Such systems do not require any additional description.

I claim:

1. A seat belt system comprising: means to anchor at least one end of a seat belt to a vehicle comprising an elongate rail, and a seat belt termination assembly movable along said rail and connected to said one end of said seat belt; and means to drive said termination assembly along said rail comprising a motor to drive a drive element which extends along the rail, and means for releasably connecting said termination assembly to said drive element such that the connection will be released if, when said termination assembly is being driven in a predetermined direction, a predetermined force is applied to said termination assembly retarding or preventing the movement of said termination assembly.

2. A system according to claim 1 wherein a locking station is provided on the rail into which said termination assembly may be locked when the seat belt is in the operative condition.

3. A seat belt system comprising: means to anchor at least one end of a seat belt to a vehicle comprising an elongate rail, and a seat belt termination assembly movable along said rail and connected to said one end of said seat belt; and means to drive said termination assembly along said rail comprising a motor to drive a drive element which extends along said rail, with said termination assembly being releasably connected to said drive element by means of a toggle latch connection.

4. A system according to claim 3 wherein the drive element is an elongate element which terminates in a shoe that is slidable along the rail, the shoe having an engagement means to engage the termination assembly.

5. A system according to claim 1 wherein said engagement means comprise an engagement projection.

6. A system according to claim 4 wherein the shoe has a lateral flange slidable in an undercut groove in a channel that constitutes the rail.

7. A system according to claim 3 wherein the toggle latch is carried by the termination assembly.

8. A system according to claim 3 wherein the toggle latch is provided with means to manually operate the toggle latch at will.

9. A system according to claim 3 wherein components of the toggle latch carry cam followers located to follow cams provided at or adjacent a locking station to facilitate disengagement of the termination assembly and the drive element at the locking station.

10. A system according to claim 3 wherein the toggle latch includes an engagement element to engage the drive element, the engagement element being pivotally connected to an adjacent element of the latch, and being pivotally mounted on an element that passes through an elongate slot therein.

11. A system according to claim 10 wherein the pivot means connecting the engagement element to the next adjacent element of the latch can rest in one of two notches or recesses, corresponding to an engaged position and a disengaged position of the engagement element.

12. A system according to claim 3 wherein a locking station, into which said termination assembly may be locked when said seat belt is in the operative condition, is provided on said rail.

13. A system according to claim 12 wherein components of the toggle latch engage parts of the locking station to retain the termination assembly at the locking station until re-connected with the drive element or manually released.

14. A system according to claim 12 wherein: said drive element is an elongate element which terminates in a shoe which is slidable along said rail; and said toggle latch connection includes a toggle latch carried by said termination assembly and means disposed on said shoe and engageable by said toggle latch.

15. A system according to claim 14 wherein said toggle latch includes components which carry cam followers located to follow cams provided at or adjacent said locking station to facilitate disengagement of said termination assembly and said drive element at said locking station.

16. A system according to claim 15 wherein said toggle latch includes components which engage parts of said locking station to retain said termination assembly at said locking station until re-connected with said drive element or manually released.

17. A system according to claim 16 wherein said toggle latch includes a first element for engaging said drive element, with said first element being pivotally connected to an adjacent element of said latch, and being pivotally mounted on an element that passes through an elongate slot therein.

18. A system according to claim 17 wherein the pivot means connecting said first element to the next adjacent element of said latch can rest in one of two notches or recesses, corresponding to an engaged position and a disengaged position of said first element.

* * * * *